United States Patent
Williams

[11] Patent Number: 5,976,364
[45] Date of Patent: Nov. 2, 1999

[54] APPARATUS FOR TREATING AIR CONDITIONER CONDENSATE WITH ALGICIDE

[75] Inventor: Danny R. Williams, Pearland, Tex.

[73] Assignee: Innovation Unlimited, Inc., Pearland, Tex.

[21] Appl. No.: 08/847,920

[22] Filed: Apr. 28, 1997

[51] Int. Cl.⁶ .................................................. C02F 1/50
[52] U.S. Cl. ..................... 210/136; 210/198.1; 210/206; 210/232; 422/275; 422/277; 137/268
[58] Field of Search ....................... 422/261, 275, 422/264, 276, 277; 210/198.1, 136, 206, 232, 209, 416.1; 137/268

[56] References Cited

U.S. PATENT DOCUMENTS

| | | |
|---|---|---|
| 3,089,508 | 5/1963 | Schulze et al. . |
| 3,595,786 | 7/1971 | Horvath et al. .......................... 210/756 |
| 3,712,511 | 1/1973 | Magnasco . |
| 3,772,193 | 11/1973 | Nelli et al. ............................... 210/756 |
| 3,867,290 | 2/1975 | Mackey . |
| 3,990,855 | 11/1976 | Cort et al. . |
| 4,083,067 | 4/1978 | Leb et al. . |
| 4,199,001 | 4/1980 | Kratz ....................................... 137/268 |
| 4,250,911 | 2/1981 | Kratz ....................................... 137/268 |
| 4,331,174 | 5/1982 | King, Sr. ................................. 137/268 |
| 4,732,689 | 3/1988 | Harvey et al. ........................... 210/754 |
| 4,759,907 | 7/1988 | Kawolics et al. ............................ 422/7 |
| 5,053,206 | 10/1991 | Maglio et al. ........................... 422/264 |
| 5,064,624 | 11/1991 | King ........................................ 422/264 |
| 5,076,315 | 12/1991 | King ........................................ 137/268 |
| 5,089,127 | 2/1992 | Junker et al. ........................... 210/206 |
| 5,217,191 | 6/1993 | Smith ........................................ 248/55 |
| 5,402,813 | 4/1995 | Keen ........................................ 137/15 |
| 5,427,748 | 6/1995 | Wiedrich et al. ....................... 422/284 |
| 5,514,344 | 5/1996 | D'Agaro . |

*Primary Examiner*—Richard L. Chiesa
*Assistant Examiner*—Fred Prince
*Attorney, Agent, or Firm*—Bracewell & Patterson, L.L.P.

[57] ABSTRACT

An apparatus provides for dissolving biotic growth inhibitor composition, usually in the form of blocks or tablets, into air conditioner condensate fluid to prevent biotic growth. Condensate fluid from a collector pan or receptacle near the air conditioner enters the apparatus and contacts the inhibitor composition, typically an algicide, and slowly dissolves the inhibitor. The apparatus has an inhibitor housing for holding the biotic growth inhibitor and an inhibitor container, located within the housing, which allows contact between the inhibitor and condensate while retaining undissolved inhibitor in the housing and preventing it from being washed out. The apparatus is connected with the drain pipe by an inlet port and an outlet port which direct the condensate into and out of the inhibitor housing.

17 Claims, 2 Drawing Sheets

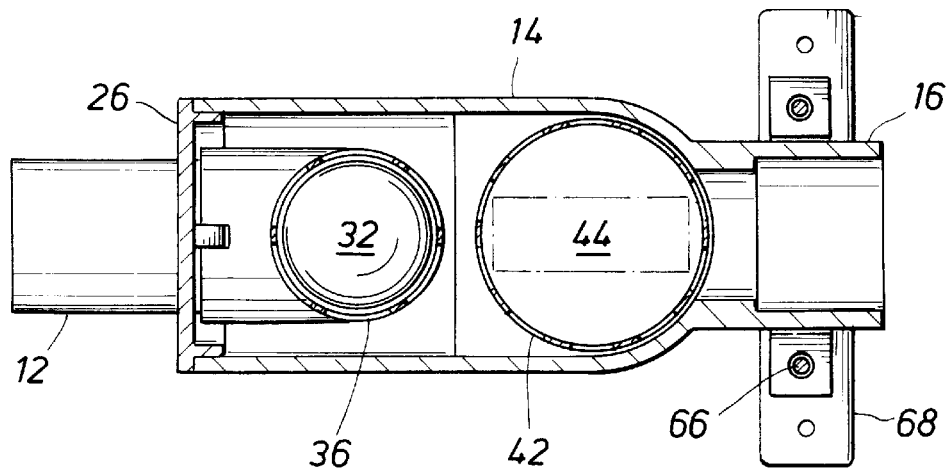
FIG. 3
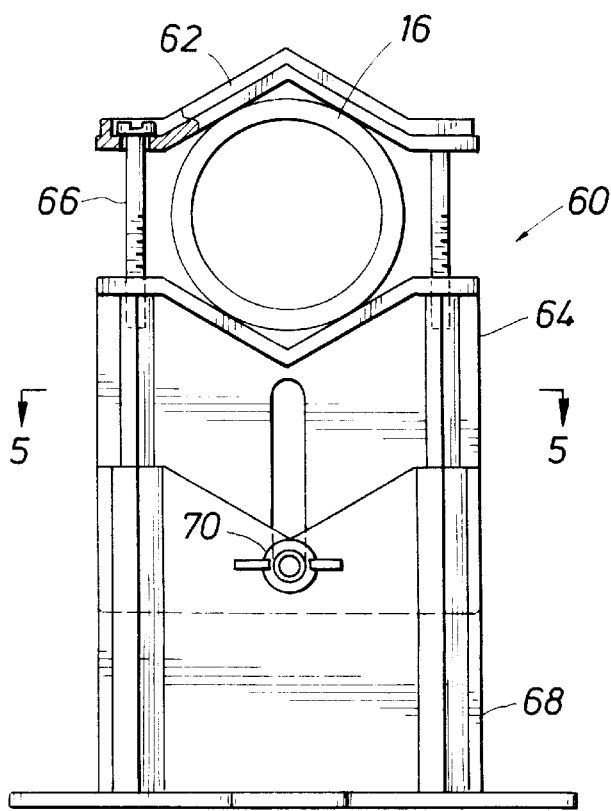
FIG. 4
FIG. 5

APPARATUS FOR TREATING AIR CONDITIONER CONDENSATE WITH ALGICIDE

FIELD OF THE INVENTION

This invention relates to an apparatus for preventing biotic growth in drain pipes. More specifically, the invention relates to an apparatus which allows addition of algicide to air conditioner condensate pipes to prevent biotic growth.

BACKGROUND OF THE INVENTION

Condensate formation has been a problem traditionally associated with use of air conditioners and other refrigeration systems. When humid air contacts an air conditioner's cold evaporator coils, moisture from the air condenses on the coils. The condensed moisture, called "condensate," must be collected and disposed of to prevent water damage to property in the vicinity of the air conditioner.

To collect the condensate that drips off the air conditioner's evaporator coils, a drain pan has been typically placed below the coils. The condensate collected in the drain pan was then carried through drain pipes to a sewer system or an outside area. A common problem occurring with condensate drain pipes has been that biotic growth, such as algae or fungus, formed in the pipes and blocked the flow of condensate. The blockage caused by this biotic growth resulted in condensate backing up in the drain pan and ultimately spilling over into the surrounding area.

SUMMARY OF THE INVENTION

Briefly, the present invention provides an apparatus for dissolving a biotic growth inhibitor composition, usually in the form of blocks or tablets, into air conditioner condensate fluid to prevent biotic growth in drain pipes. Condensate fluid from a collector pan or receptacle near the air conditioner enters the apparatus and contacts the inhibitor composition, typically an algicide, and slowly dissolves the inhibitor. The apparatus has an inhibitor housing for holding the biotic growth inhibitor and an inhibitor container, located within the housing, which allows contact between the inhibitor and condensate while retaining undissolved inhibitor in the housing and preventing it from being washed out. The apparatus is connected with the drain pipe by an inlet port and an outlet port which direct the condensate into and out of the inhibitor housing.

BRIEF DESCRIPTION OF THE DRAWINGS

A better understanding of the invention can be obtained when the detail description set forth below is reviewed in conjunction with the accompanying drawings, in which:

FIG. 3 is a cross sectional view taken along line 3—3 of FIG. 2;

FIG. 4 is cross sectional view taken along the line 4—4 of FIG. 2; and

FIG. 5 is a cross sectional view taken along line 5—5 of FIG. 4.

DETAILED DESCRIPTION OF PREFERRED EMBODIMENT

Figure 1:
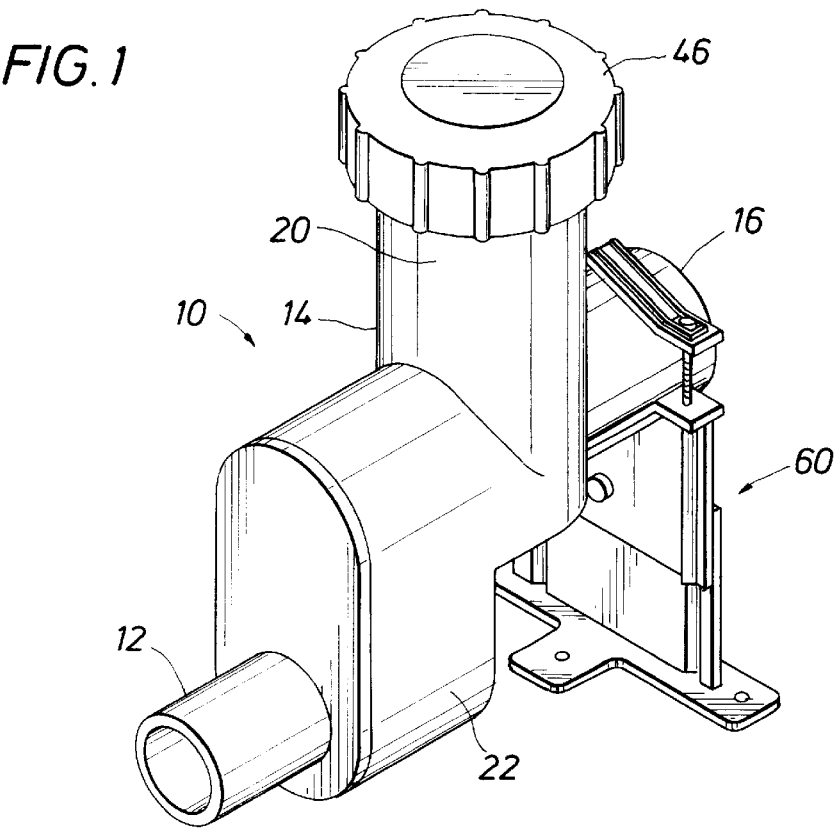
FIG. 1 is a isometric view of an apparatus for treating air conditioner condensate with algicide according to the present invention.

As shown in FIG. 1, the present invention is an apparatus 10 for dissolving biotic growth inhibitor into air conditioner condensate to prevent biotic growth in condensate drain pipes. The apparatus 10 is connected into a condensate drain pipe by attaching an inlet port 12 to an upstream portion of the drain pipe. Condensate flows from the upstream portion of the drain pipe and into inlet port 12. Inlet port 12 directs the condensate into inhibitor housing 14 where the condensate contacts and partially dissolves the inhibitor. After some inhibitor dissolves into the condensate, the condensate flows out of the apparatus 10 through an outlet port 16 and into a downstream portion of drain pipe.

Figure 2:
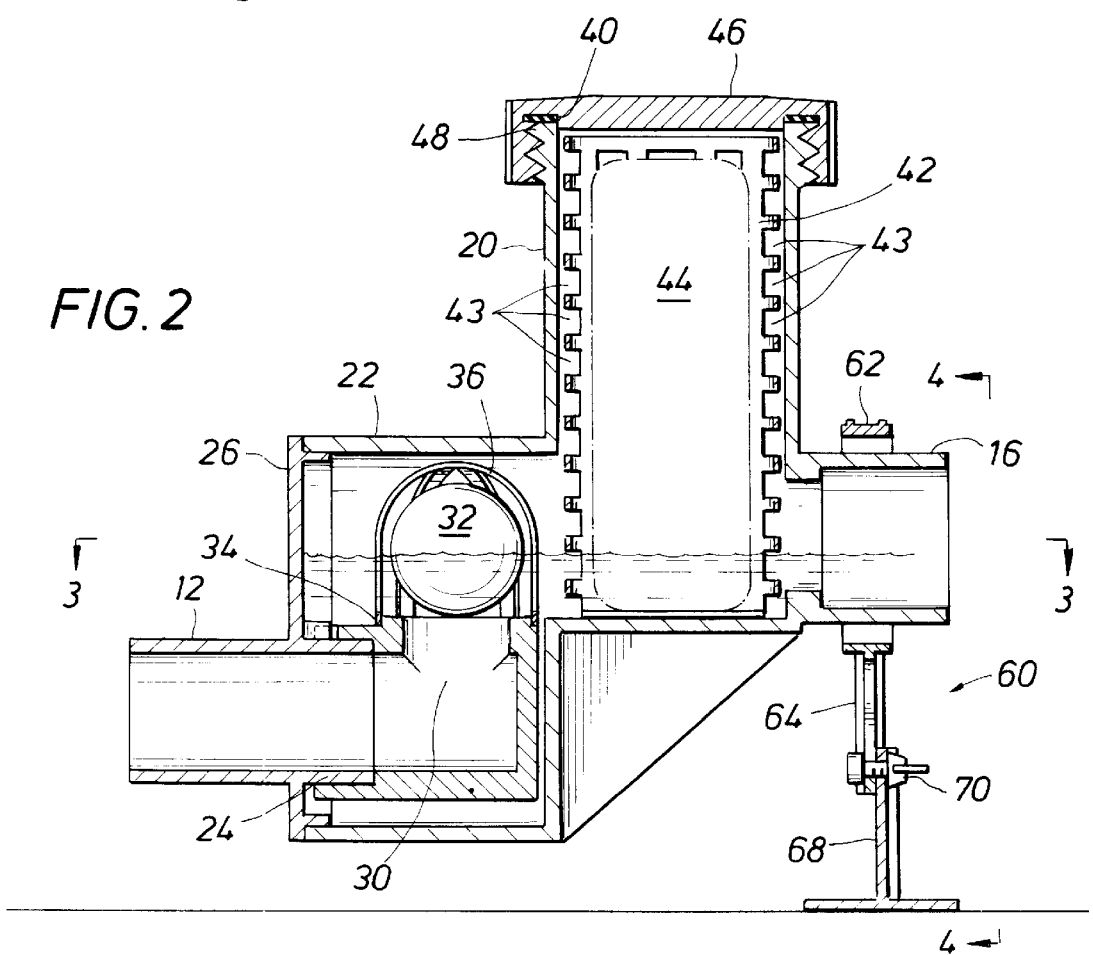
FIG. 2 is an elevation view taken partly in cross section, of the apparatus of FIG. 1.

As shown in FIG. 2, inlet port 12 is tubular and extends outwardly from inhibitor housing 14 to enable easy connection to the drain pipe or directly to the drain pan. Inlet port 12 can be of any configuration necessary to allow a sealed connection to the drain pipe or drain pan. Inlet port 12 can connect directly to the upper portion 20 of inhibitor housing 14, or to a lower portion 22 of inhibitor housing 14 when a ball-and-seat check valve 30 is utilized, as shown in FIG. 2. In either case, inlet port 12 is in fluid communication with inhibitor housing 14. In a preferred embodiment of the present invention, check valve 30 is connected to an interior portion 24 of inlet port 12 inside lower portion 22 of inhibitor housing 14.

Check valve 30 allows forward flow of condensate but prevents gases from backing up through apparatus 10 toward the air conditioner evaporator. Check valve 30 has a ball 32 which rests proximately above a ball seat 34. As condensate enters the check valve, ball 32 is lifted off of ball seat 32 and the condensate flows forward through the apparatus 10. Once the condensate has been drained off or evaporated, ball 32 drops onto ball seat 34 to seal closed check valve 30. In the closed position, check valve 30 prevents gases from backing up through apparatus 10 into the upstream drain pipe and into the vicinity of the air conditioner. A ball cage 36 encloses ball 32 and keeps ball 32 in vertical alignment with ball seat 34. As can be appreciated, check valve 30 can be a ball-and-seat type valve, as shown, or any other type of check valve capable of preventing gases from backing up through the apparatus 10.

Condensate flows forward through check valve 30 and spills into the bottom of upper portion 20 of inhibitor housing 14. Inside the upper portion 20 of inhibitor housing 14 is an inhibitor container 42. Inhibitor container 42 has a plurality of holes or openings 43 found in it along its side walls, as shown. The openings 43 allow physical contact between the condensate and an inhibitor 44 as the condensate flows through the inhibitor housing. Inhibitor container 42 holds inhibitor 44 inside upper portion 20 of inhibitor housing 14 and prevents inhibitor 44 from washing out with the condensate. This is especially important after inhibitor 44 has been decreased in size due to partially dissolving in the condensate.

Inhibitor 44 may be of any variety known to inhibit biotic growth. Preferably, inhibitor 44 is composed of an algicide in solid form which slowly dissolves upon contact with condensate. Because inhibitor 44 dissolves over time, it is important that the inhibitor be routinely replaced.

A top end 40 of inhibitor housing 14 defines a top port for adding inhibitor 44 to inhibitor container 42 within inhibitor housing 14. An access cap 46 covers the top port and can be used for access to the inhibitor container 42. Access cap 46 should be of a type that will adequately seal shut the inhibitor housing and prevent any possible condensate spillage from the top port. Preferably, cap 46 can be screwed onto a threaded portion 48 on top end 40 to ensure this seal.

Once the condensate has passed through inhibitor housing 14, it is directed into the downstream portion of the drain pipe by outlet port 16. Outlet port 16 is tubular and extends outwardly from inhibitor housing 14. Generally, outlet port 16 is positioned on the opposite side of inhibitor housing 16 from inlet port 14. This allows apparatus 10 to be inserted into a straight section of drain pipe.

Outlet port 16 can be of any type configuration that allows a tight seal to the downstream portion of drain pipe. Preferably, however, outlet port 16 is a female connector into which the end of the downstream portion of drain pipe can be inserted.

As an optional feature, apparatus 10 may be supported by an adjustable bracket support assembly 60. As shown in FIG. 4, bracket support assembly 60 has an upper bracket 62 for attaching bracket support assembly 60 to outlet port 16. Upper bracket 62 is attached to a lower bracket 64 by mounting bolts 66. Mounting bolts 66 can be loosened to allow installation of bracket support assembly 60 and then tightened such that upper bracket 62 and lower bracket 64 fit firmly around outlet port 16. Lower bracket 64 is slidably connected to a base 68 to allow adjustment of the height of lower bracket 64. A locking mechanism 70 locks lower bracket 64 and base 68 together after the proper height adjustments are made. Preferably, locking mechanism 70 is a bolt and wing nut assembly which allows loosening and tightening by hand. As shown in FIG. 5, base 68 has a plurality of apertures 72 for facilitating mounting of bracket support assembly 60 to supporting structures.

As previously stated, the apparatus 10 allows the addition of algicide, usually in block or tablet form, to air conditioner condensate to prevent biotic growth in condensate drain pipes. Apparatus 10 is inserted into the drain pipe by connecting inlet port 12 to an upstream portion of drain pipe and connecting outlet port 16 to a downstream portion of drain pipe. Condensate flows from the drain pipe through inlet port 12 and into inhibitor housing 14 where it contacts and slowly dissolves the algicide. The condensate with dissolved inhibitor then flows out of apparatus 10 through outlet port 16 and back into the drain pipe to prevent biotic growth in the drain pipe. Additionally, check valve 30 prevents gases from backing up through apparatus 10.

It should be understood that there can be improvements and modifications made of the embodiments of the invention described in detail above without departing from the spirit or scope of the invention as set forth in the accompanying claims.

What is claimed is:

1. An apparatus for treating air conditioner condensate from a drainage pipe with a biotic growth inhibitor comprising:
   an inlet port connected to the drainage pipe for receiving incoming air conditioner condensate;
   an inhibitor housing for holding the biotic growth inhibitor at a position in contact with the incoming condensate to treat and inhibit biotic growth, said inhibitor housing receiving the biotic growth inhibitor mounted therein to maintain a constant amount of said biotic growth inhibitor in contact with said condensate;
   a check valve in said inhibitor housing for preventing gases from backing up through the drainage pipe; and
   an outlet port for allowing treated condensate to exit said inhibitor housing.

2. The apparatus of claim 1, further including an inhibitor container mounted in said inhibitor housing for receiving the biotic growth inhibitor.

3. The apparatus of claim 2, wherein the inhibitor container has a plurality of openings for allowing physical contact between the condensate and the inhibitor.

4. The apparatus of claim 2, further comprising a access cap for accessing said inhibitor container.

5. The apparatus of claim 1, further comprising an adjustable bracket support assembly for supporting said outlet port.

6. The apparatus of claim 1, wherein said check valve comprises:
   a ball seat;
   a ball guide mounted above said ball seat; and
   a ball positioned within said ball guide.

7. The apparatus of claim 1, wherein said check valve is located adjacent said inlet port.

8. An apparatus for treating air conditioner condensate in a drain pipe with a biotic growth inhibitor comprising:
   an inlet port for receiving incoming air conditioner condensate from the drain pipe;
   an inhibitor housing for holding the biotic growth inhibitor at a position in partial contact with the incoming condensate to treat and inhibit biotic growth, said housing having an upper portion, a lower portion, and a top port for adding the biotic growth inhibitor to said housing;
   said inlet port being formed in said inhibitor housing;
   an inhibitor container mounted in said inhibitor housing for receiving the biotic growth inhibitor and having a plurality of openings for allowing physical contact between the condensate and the inhibitor, said biotic growth inhibitor being mounted in said inhibitor housing to maintain a constant amount of said biotic growth inhibitor in contact with said condensate;
   a check valve in said inhibitor housing adjacent said inlet port for preventing gases from backing up through the drain pipe; and
   an outlet port for allowing treated condensate to exit said inhibitor housing.

9. The apparatus of claim 8, wherein said inhibitor container is removable from said inhibitor housing.

10. The apparatus of claim 8, wherein said check valve comprises:
    a ball seat;
    a ball guide mounted above said ball seat; and
    a ball positioned above said ball seat and within said ball guide.

11. The apparatus of claim 8, wherein said check valve is located inside the lower portion of said inhibitor housing.

12. The apparatus of claim 8, further including an access cap for accessing said inhibitor container.

13. The apparatus of claim 12, wherein said access cap forms a water tight seal with the inhibitor housing.

14. The apparatus of claim 8, further comprising an adjustable bracket support assembly for supporting said outlet port.

15. The apparatus of claim 14, wherein said adjustable bracket support assembly comprises:
    a lower bracket supporting said outlet port from underneath;
    an upper bracket for securing the lower bracket to said outlet port;
    a plurality of mounting bolts for securing the upper bracket to the lower bracket;
    a base capable of being height adjusted; and
    a locking mechanism for locking the base to the lower bracket at the adjusted height.

16. The apparatus of claim 1, said inhibitor housing having a lower interior surface for receiving the biotic growth inhibitor to rest thereon such that the biotic growth inhibitor is in the flow path of said condensate.

17. The apparatus of claim 8, said inhibitor housing having a lower interior surface for receiving the biotic growth inhibitor to rest thereon such that the biotic growth inhibitor is in the flow path of said condensate.

* * * * *